No. 868,814. PATENTED OCT. 22, 1907.
J. J. SCHERMACK.
SPRING WHEEL.
APPLICATION FILED FEB. 25, 1907.
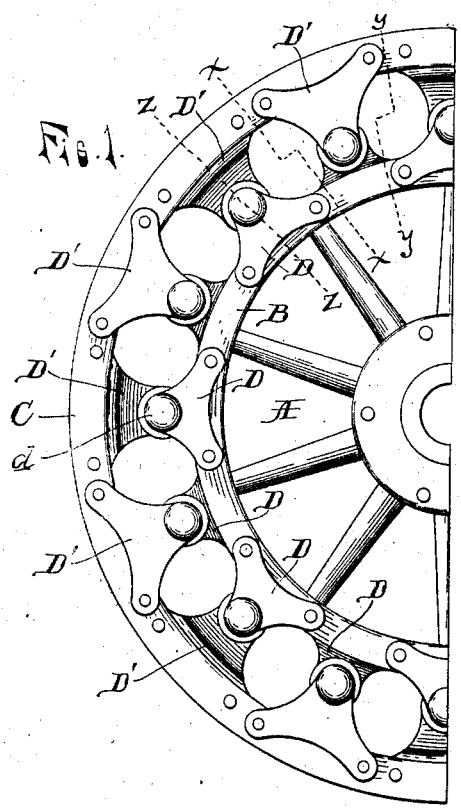
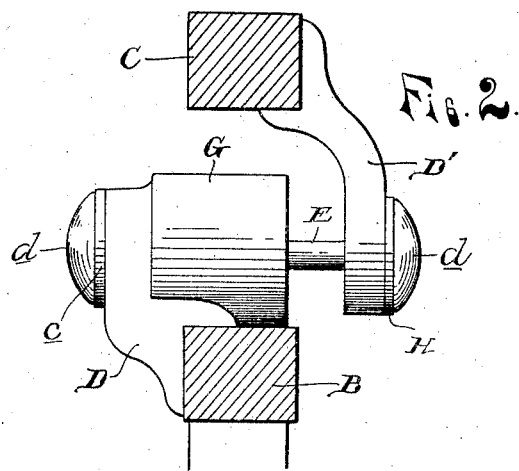
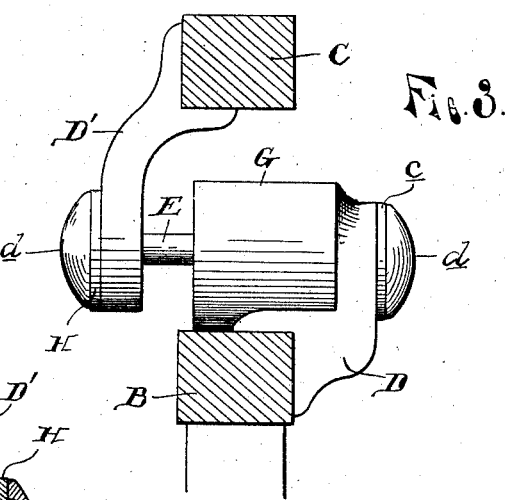
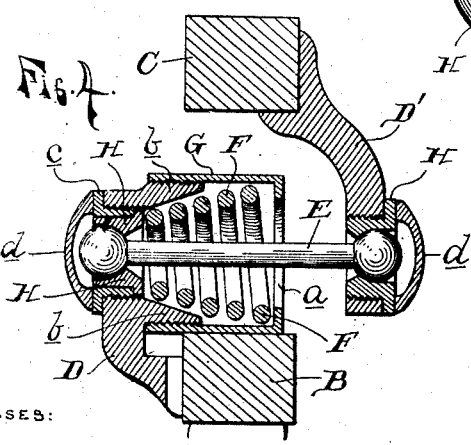
WITNESSES:
INVENTOR
Joseph J. Schermack
Attorneys

UNITED STATES PATENT OFFICE.

JOSEPH J. SCHERMACK, OF DETROIT, MICHIGAN.

SPRING-WHEEL.

No. 868,814.

Specification of Letters Patent.

Patented Oct. 22, 1907.

Application filed February 25, 1907. Serial No. 359,320.

*To all whom it may concern:*

Be it known that I, JOSEPH J. SCHERMACK, a citizen of the United States of America, residing at Detroit, in the county of Wayne and State of Michigan, have invented certain new and useful Improvements in Spring-Wheels, of which the following is a specification, reference being had therein to the accompanying drawings.

This invention relates to that kind of spring wheel in which the cushioning springs are connected transversely between the rim of the wheel and its tire.

The present improvement has for its primary object to interpose the springs in such manner that the cushioning effect is produced by the collective action of springs.

To this end my invention consists in the novel manner in which the springs are interposed between an inner and outer rim, all as more fully hereinafter described and shown in the accompanying drawings, in which:

Figure 1 is an elevation of one half of the wheel; Fig. 2 is a section on line x—x Fig. 1; Fig. 3 is a section on line y—y Fig. 1; Fig. 4 is a section on line z—z Fig. 1.

Referring to the drawings A represents a wheel comprising an internal rim B which is supported on the hub of the wheel in any desired manner and C is an external rim spaced therefrom, and between the two rims the resilient means are applied in the following manner: The two rims are provided circumferentially with alined projections or brackets D D′ on alternately opposite sides of the rims in such manner that each projection on one rim is oppositely alined with one on the other rim on the opposite side thereof. Preferably these brackets are formed of separate parts fastened to the respective rims and are of symmetrical shape and spaced at equal distances around the rims as shown. In the ends of each of these projections or brackets is supported the socket member H of a ball and socket connection formed between the opposite brackets of the two rims by means of a transverse connecting bar E having corresponding ball members formed at the ends.

The socket members in the brackets of one of the rims are movable by sliding in the screw bushings c. Preferably the ones carried in the brackets of the inner rim, as shown in the drawings, are made the movable ones and are guided in bearings in the brackets and those in the brackets of the outer rim are made stationary. In connection with these movable ball-sockets members I place upon each connecting bar a spiral spring F and confine it under compression in a housing G secured to the bracket in such manner that the action of the spring is against the movable ball-socket member of the connecting bar. The housing furnishes the fixed abutment for the spring and to permit the bar a free angular movement is provided with an enlarged opening a.

The springs may be ordinary coil springs but preferably I make them of helical shape and abut the contracted end against the movable ball-socket member, the interior wall of the housing being correspondingly shaped by providing the bracket with an inwardly projecting flange b to which the housing is detachably secured.

The movable ball-socket member is kept in position against outward displacement by the alternating members and suitable caps d may be secured to the screw bushings and to the fixed ball-socket members to keep out the dirt, the balls on the opposite ends of the connecting bars however being free to have a limited endwise movement in their sockets.

Having thus fully described my invention what I claim is:—

1. The combination with an internal rim connected to the hub of the wheel, of an external rim spaced therefrom said internal and external rim each circumferentially provided with projections alternately extending from opposite sides of each rim and opposite to each other in the two rims, connecting bars transversely connecting the opposite projections and forming universal connections therewith said connections being made with the projections of one of the rims through members movably supported in said projections, and springs transversely interposed under compression between said movable members and the rim of the wheel carrying the same, said rim provided with fixed abutments for said springs.

2. The combination with an internal rim connected to the hub of the wheel, of an external rim spaced therefrom, said internal and external rims circumferentially provided with projections alternately on opposite sides of each rim and opposite to each other in the two rims, connecting bars transversely connecting the opposite projections and forming universal connections therewith, the projections of one of the rims provided with connecting members for said bars movably guided in said projections, spiral springs upon said connecting bars and housings secured to the projections carrying said movable members and inclosing the springs under compression between the movable members and the housings.

3. The combination with an internal rim connected to the hub of the wheel, of an external rim spaced therefrom, said internal and external rims circumferentially provided with brackets alternately arranged on opposite sides of each rim and projecting into the space between the rims opposite to each other in the two rims, connecting bars transversely connecting the opposite projections and forming universal connections therewith, the projections of one of the rims provided with connecting members for said bars, movably guided in said projections, spiral springs upon said connecting bars, and housings secured to the projections carrying said movable members and inclosing the springs, the springs being transversely interposed in said housing under compression between the movable members and the ends of the housings, said housings provided with enlarged openings in said ends for the passage of the connecting bars.

4. The combination with an internal rim connected to the hub of the wheel, of an external rim spaced therefrom, said internal and external rims circumferentially provided with brackets alternately arranged on opposite sides of each rim and projecting into the space between the rims opposite to each other on the two rims, connecting bars transversely connecting the opposite projections and forming ball and socket connections therewith, the socket members forming said connections with the projections of one of said rims being movably guided in the projections, spiral springs upon said movable socket members and housings inclosing the springs, the springs being transversely interposed in said housings under compression between the movable socket members and the ends of the housings said ends formed with enlarged openings.

5. The combination with an internal rim connected to the hub of the wheel, of an external rim spaced therefrom, said rims circumferentially provided with projections alternately arranged on opposite sides of each rim opposite to each other on the two rims, connecting bars extending transversely between the opposite projections and formed with balls at the ends, socket members carried by the projections and engaging with the balls and forming ball and socket connections therewith, the socket members carried in the projections of the external rim being fixed and those carried by the projections of the internal rim being movably guided therein, and springs transversely interposed under compression between said movable socket members and the inner rim.

6. The combination with an internal rim connected to the hub of the wheel, of an external rim spaced therefrom, said rims circumferentially provided with projections extending oppositely to each other alternately on opposite sides of the two rims into the space between the same, connecting bars extending transversely between said projections and having ball and socket connections therewith, those with the projections of the internal rim being made with socket members movably guided in the projections, and spiral springs upon the connecting bars transversely interposed under compression between said movable socket members and the inner rim.

7. The combination with an internal rim connected to the hub of the wheel, of an external rim spaced therefrom, each of said rims provided with a circumferential series of brackets secured alternately on opposite sides thereof, the brackets of one rim being opposite to those on the other rim, connecting bars extending transversely between said projections and having ball and socket connection therewith, those with the projections of the internal rim having ball socket members movably guided in said projections, helical springs upon said connecting bars and housings secured to the internal rims and inclosing said springs under compression between the movable ball members and the opposite ends of the housings.

In testimony whereof I affix my signature in presence of two witnesses.

JOSEPH J. SCHERMACK.

Witnesses:
 J. A. MOLKE,
 ANNA M. DORR.